United States Patent [19]

Ragotin

[11] Patent Number: 4,960,487

[45] Date of Patent: Oct. 2, 1990

[54] PROCESS FOR MAKING MICROWAVE ENERGY ATTENUATING CIRCUITS

[75] Inventor: Jean-Claude Ragotin, Limours, France

[73] Assignee: Thomson-CSF, Puteaux, France

[21] Appl. No.: 427,376

[22] Filed: Oct. 27, 1989

[51] Int. Cl.[5] .......................... B44C 1/22; C23F 1/02; C03C 15/00; C03C 25/06

[52] U.S. Cl. .................................. 156/643; 51/281 P; 51/319; 156/645; 156/656; 156/664; 204/129.1; 219/121.69; 333/81 B; 333/22 R

[58] Field of Search ............... 156/643, 645, 654, 656, 156/659.1, 664; 204/129.1, 129.3, 129.35, 129.46, 129.65; 51/281 R, 281 P, 310, 315, 317, 319; 219/10.55 R, 10.55 A, 121.68, 121.69; 333/22 R, 81 R, 22 F, 81 A, 81 B, 239, 240, 248

[56] References Cited

U.S. PATENT DOCUMENTS 3,234,487 2/1966 Ebert .................................... 333/22
3,309,634 3/1967 Wheeler et al. ...................... 333/81

OTHER PUBLICATIONS

G. L. Ragan: "Microwave Transmission Circuits", edition 1, 1948, pp. 115–117, McGraw-Hill Book Company, Inc., New York, U.S.

H. J. Reich et al.: "Very High-Frequency Techniques", vol. 2, 1947, pp. 574–577, McGraw-Hill Book Company, Inc., New York, U.S.

*Primary Examiner*—William A. Powell
*Attorney, Agent, or Firm*—Oblon, Spivak, McClelland, Maier & Neustadt

[57] ABSTRACT

A process for making attenuating circuits from a waveguide, in which the guide is made from two metal parts (A, B) of elongated shape, at least one of which comprises a groove (1) over the entire length of the part or parts, the two parts (A, B) being intended to be joined to close the groove and to constitute the actual waveguide. Before assembly of the two parts, an attack is performed on the surfaces of the two parts intended to constitute the walls of the guide to roughen them. The roughness is provided, for example, by projection of a jet of sand on these walls.

4 Claims, 2 Drawing Sheets

PROCESS FOR MAKING MICROWAVE ENERGY ATTENUATING CIRCUITS

BACKGROUND OF THE INVENTION

1. Field of the Invention

The invention relates to microwave energy attenuating circuits and microwave measuring devices including an attenuating circuit and a process for making the same.

2. Discussion of Background

A microwave energy attenuating circuit is generally made by a waveguide inside of which one or more plungers consisting of an absorbing material are made to slide through openings made on a wall. The attenuation depends on the dimensions of the plunger inside the guide. The absorbing materials are generally either graphite or resins with a glass fiber base filled with graphite. Variable attenuators are obtained by coupling the plunger or plungers to a micrometer screw which makes it possible to regulate more or less the sinking of the plunger inside the guide.

The drawback of such attenuators resides in the fact that the waves attenuated by the plunger are also phase shifted by the plunger. Now, in numerous applications, the phase shift that this type of attenuator introduces is unacceptable.

There are also precision-type attenuators, i.e., attenuators that do not phase shift the waves. These attenuators also consist of a waveguide inside which a metallized mica sheet can turn around a stationary plate placed in a plane perpendicular to the electric field. The drawback of such attenuators comes from the fact that they cannot receive an energy power of more than one watt at 100 GHz or more than several watts in the lower bands. Beyond this limit the mica sheet is burned and the tube heats up.

On the other hand, it is known for klystron-type microwave tubes to vary the Q factor of a resonant cavity by increasing the energy losses in this cavity, i.e., by causing an attenuation inside the cavity. Actually, what occurs is an attenuation of the microwave energy inside the cavity in order to increase the passband of the cavity. For this purpose, a technique is used which consists in lining the interior of the cavity with adhesive strips on which are deposited iron filings, the iron being a good absorbent. Subsequently sintering is performed so that by firing, at the molecular level there is an interpenetration of the filings into the material constituting the cavity. This material is generally copper.

Because these cavities are under vacuum, this solution cannot be used for attenuating circuits which are not under the same conditions and which often, on the contrary, are in a humid environment. In such an environment oxidation, blistering and lastly a detachment of the deposit occurs.

Besides the drawbacks that have just been described, no existing attenuating circuit has all of the following characteristics:

constant attenuation independent of the frequency of the waves in a given band located around 100 GHz capability of receiving more than 1 W in this range of frequencies;

capability of allowing an attenuation of at least 15 to 20 dB;

no alteration due to a humid atmosphere; and no involuntary phase shift during attenuation.

This invention makes it possible to remedy these problems.

SUMMARY OF THE INVENTION

Accordingly, it is an object of the present invention to provide a process for making microwave energy attenuating circuits comprising conductive metal elements on which microwave currents flow, characterized in that it consists in roughening the surfaces of the conductive elements on which the currents flow, with these surfaces exhibiting a granular appearance, after an attack of the constituent metal.

The process according to the invention consists in performing an attack of the metal constituting the walls of the conductors by projection of a jet of sand or balls or by other methods such as electroerosion or etching.

The process according to the invention consists in making an attenuating circuit including a waveguide, characterized in that the guide is made from two metal parts, elongated in shape, at least one of which having a groove over the entire length of the part or parts, the two parts being intended to be joined to close the groove and to constitute the actual waveguide and characterized in that, before assembly of the two parts, the surfaces of the two parts, intended to constitute the walls of the waveguide, are rough, with the roughness being caused by attack of the constituent metal.

Another characteristic of the process according to the invention consists in rough walls having grains of a size which is not constant over the entire length of the guide.

The process according to the invention also consists in making an attenuating circuit from a resonant or nonresonant cavity, characterized in that it consists in roughing the inside walls of the cavity, the roughness being obtained by attack of the constituent metal.

The invention also has as its object a microwave measuring device of the purity of the mode at the output of a gyrotron, this device comprising a low level detector of a maximum of 10 mW to detect the maxima of the electric fields of the mode, the radiation at the output of the gyrotron, whose power is greater than or equal to 10 W, being collected by a horn, characterized in that it comprises an attenuating circuit comprising a waveguide obtained by the process according to the invention.

The invention also has as its object a device for measuring the power of energy radiated by a microwave power source comprising a calorimeter, characterized in that it consists in placing an attenuator, consisting of a waveguide made by the process according to the invention, between the source and calorimeter.

The invention also has as its object a microwave device comprising an attenuator obtained by the process, this attenuator being short-circuited at one of its ends to achieve an adapted charge.

BRIEF DESCRIPTION OF THE DRAWINGS

The invention will be better understood with the help of the detailed description which is given by way of nonlimiting example and which is illustrated by the following drawings in which.

DETAILED DESCRIPTION OF THE PREFERRED EMBODIMENT

Figure 1:
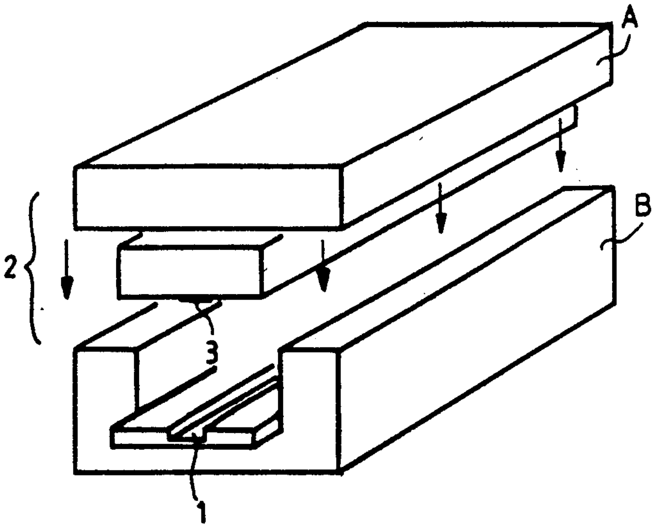
FIG. 1 represents an attenuating circuit made by the process according to the invention.

The invention relates to a process of making microwave energy attenuating circuits. It also relates to attenuating circuits obtained by the process and microwave devices comprising an attenuating circuit obtained by the process.

Whether a waveguide or resonant cavities or nonresonant cavities are involved, microwave currents flow on the metal conductive surfaces. Generally, the metal used is either copper, brass or stainless steel.

The process consists, according to the invention, in roughening the metal surfaces on which the microwave currents flow, which causes an attenuation of the power of the energy. The process consists in obtaining this roughness by attack of the metal constituting the surfaces, either by projection of a jet of sand on the these surfaces, by projection of balls, by electroerosion or by etching. These various techniques make it possible to cause an attack of the metal on the surface. The metal exhibits a granular surface, with the grains having larger or smaller diameters in proportion to the duration of the attack. To obtain grains of larger diameters, for example, the duration of the projection of sand or balls on the attacked surface is increased whereas for lesser diameters, it is decreased.

The process according to the invention consists in making an attenuating circuit as a waveguide. The constructed attenuator is represented in an exploded form in FIG. 1.

The attenuator according to the invention comprises two metal parts A and B obtained from a stainless steel block which has been machined. These parts are complementary, i.e., each has a shape that enables it to fit into the other to obtain a parallelepipedic or cylindrical part which is not bulky.

At least one of these two parts includes a straight groove 1 machined in the body. This groove has a parallelepipedic shape and partially constitutes the actual waveguide, its dimensions being adapted to the working frequency band of the emitting microwave source. Preferably the groove is machined on only one of the two parts. Before assembly of the two parts A and B to make them detachably integral such as with bolts, they are placed, for example, under a sand jet so the walls of the groove are attacked by the jet as well as surface 3 of part A, which is opposite the groove, this surface constituting the fourth wall forming the guide. Several tests were made. With a guide length of 100 mm, the guide being of stainless steel, the grains of the guide surface being 0.04 mm, the dimensions of guide 2 being adapted to the range of frequencies of 75–110 GHz, the attenuation obtained is 6.2 dB (or 62 dB per meter) and the standing-wave ratio (SWR) is less than or equal to 1.15.

With a guide length of 200 mm, the guide being of stainless steel, grains with a diameter of 0.06 mm, the dimensions of the guide being adapted to the range of 75–110 GHz, the attenuation obtained is 28 dB (or 140 dB per meter) and the standing-wave ratio (SWR) is less than or equal to 1.15.

The standing-wave ratio can be improved by performing a progressive attack on the metal in the guide to have a zone at the input of the guide (which can be at either end of the guide) with grains of smaller diameter (0.04 mm for about i cm), the grains being larger over practically the entire length of the guide.

Figure 2:
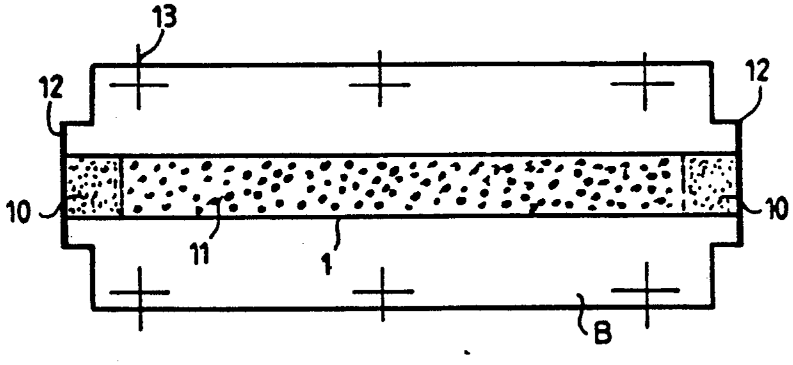
FIG. 2 represents an attenuating circuit according to FIG. 1, shown in longitudinal section.

Part B of the attenuator is shown in top view in FIG. 2. Zones 10 with grains of small diameter have been shown by dots of small diameter, and zone 11 with grains of larger diameter by larger size dots. Passage from one size to the other can, of course, be progressive.

To improve the coupling of the attenuator with the circuits to which it is connected, connecting flanges 12 are polished and covered with a deposit of gold.

After treatment of the walls of guide 2, the two parts A and B are positioned, for example, by guide pins (not represented) and held mechanically by bolts. The threads 13 are shown in FIG. 2. Connecting ends 12 are polished and covered by a gold film.

Figure 3:
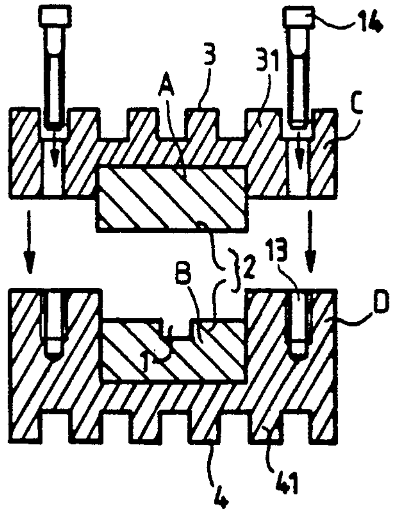
FIG. 3 represents a variant embodiment of an attenuating circuit according to the invention, the circuit being shown in cross section and represented in exploded form.

FIG. 3 shows, in exploded form, a cross section of an attenuating circuit comprising a waveguide consisting of two parts A and B, for example, of stainless steel, and an energy dissipation circuit also consisting of two parts C and D, being made, for example, of copper. The attenuator is thus not a single-piece structure. Part B comprises a groove 1 which has rough walls, the roughness having been obtained in the same way as previously described.

The difference between the FIG. 3 guide and the attenuator constituted by the guide represented in FIG. 1, is that the guide represented in this FIG. 3 is surrounded, according to this embodiment, by an energy dissipation circuit whose first part C takes the peripheral shape of part A, and whose second part D takes the peripheral shape of part B. Part A is fitted into part C, part B is fitted into part D. Parts C and D are brought together and fastened to one another by removable fastening means such as bolts 14. After tightening of bolts 14, parts A and B are in contact, a play between parts C and D being provided to obtain the best contact between parts A and B. The outside surfaces of parts C and D, which are in planes parallel to the planes corresponding to the larger sides of the guide, are notched. These surfaces therefore comprise grooves 31, 41 intended to promote cooling of the attenuator.

Figure 4:
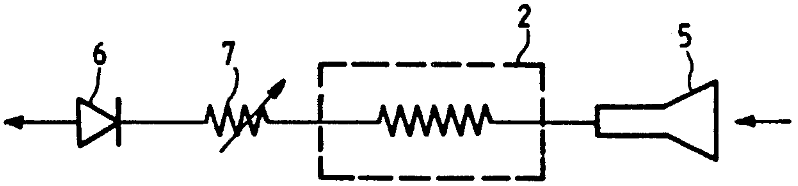
FIG. 4 represents a diagram of an embodiment of a measuring device for analysis of the purity of the mode at the output of a microwave source, comprising an attenuating circuit according to the invention.

FIG. 4 represents a diagram of a first application of an attenuating circuit. It is a measuring device for analysis of the purity of the mode of the output of a microwave source, for example, a gyrotron-type tube. This device therefore comprises an attenuating circuit according to the invention.

In the particular constructed embodiment, the measurement consists in detecting the maxima of the electric field presented by a microwave radiation supplied by a gyrotron according to a predetermined mode. This radiation therefore is produced in this particular embodiment in a gyrotron operating at 100 GHz with a peak power of 200 kW radiating according to the mode TE 04. The application therefore consists in moving a horn in front of the output window of the gyrotron to capture, successively by a standard detector 6, each of the radiation maxima of the mode. The maximal power which such detectors can support is 10 milliwatts. Therefore it is necessary to use an attenuating circuit between horn 5 and detector 6. Attenuator 2, as described from FIG. 1, therefore is placed at the output of horn 5 which is used for adaptation purposes and which makes it possible to collect approximately 10 W over a maximum field.

In series with this attenuator 2, a calibrated attenuator 7 is also used which can dissipate at most 0.6 W. This low power attenuator makes it possible to attenuate the power of the output signal of attenuator 2 which should not exceed 0.6 W, to a level accepted by the detector, or 10 mW at most.

Medium power attenuator 2 makes it possible to obtain an attenuation of 15 to 20 dB of an input power of 10 W (horn output).

In case the output power of the horn is much greater than 10 W for example beyond 100 W, an attenuating circuit is used with energy dissipation as represented in FIG. 3, providing an attenuation of 20 to 30 dB.

Figure 5:
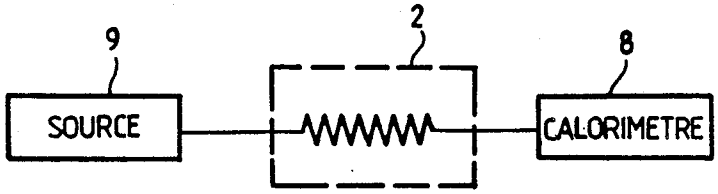
FIG. 5 represents a diagram of an embodiment of a device for measuring the power of a microwave power source comprising an attenuating circuit according to the invention.

FIG. 5 shows another diagram of an application of an attenuating circuit in a circuit for measuring the power of a power source.

Classically, the power source is connected by a coupling, on the one hand, to a calorimeter and, on the one hand, to a load which dissipates the power which is not coupled to the calorimeter. The calorimeter makes it possible to measure powers of up to 10 W. For this reason it is imperative to use a quality coupler and a load.

The measuring circuit according to the invention comprises an attenuator 2 as represented in FIGS. 1, 2 or 3. The attenuator avoids the use of the coupler and load.

Actually, the measuring circuit comprises, in series, a power source 9 greater than 10 W, an attenuator 2, and a calorimeter with maximal power of 10 W. The attenuator provides an attenuation of 10 to 20 dB or more, depending on the application. The length is selected to provide an attenuation which is desired and acceptable to the calorimeter.

The attenuating circuit according to the invention can also be used as an adapted load. The embodiment has not been represented, but to achieve such an adapted load, it is possible to refer to the diagram of FIG. 1, in which it suffices to imagine that one of the ends is closed. The part placed at the end acts as a short circuit. The load thus achieved makes it possible to obtain an attenuation of 20 dB in the forward direction of the wave and 20 dB in the return direction, which leads to a perfect attenuation of 40 dB, the standing-wave ratio being less than 1.02.

What is claimed as new and desired to be secured by Letters Patent of the United States is:

1. A process for making microwave energy attenuating circuits, said process comprising the steps of:

providing conductive metal elements on which microwave currents flow; and roughening the surfaces of the conductive elements on which the currents flow, by performing an attack of the metal constituting the walls of the conductors, whereby surfaces of said walls exhibit a granular appearance after the attack of the metal which constitutes the surfaces.

2. Process according to claim 1, wherein said step of performing an attack of the metal constituting the walls of the conductors includes projection of a jet of sand or balls or the like, or by electroerosion, laser or etching.

3. Process for making attenuating circuits according to claim 1 or 2, from a waveguide, wherein said step of roughening includes roughening walls having grains of sizes that are not constant over the length of the attenuating guide.

4. Process for making attenuating circuits according to claim 1 or 2, from a resonant or nonresonant cavity, wherein said step of roughening consists in roughing the inside walls of the cavity, the roughness being obtained by an attack of these walls.

* * * * *